United States Patent
Krueger et al.

(10) Patent No.: US 10,457,412 B2
(45) Date of Patent: Oct. 29, 2019

(54) ELECTRICAL ISOLATION OF ANGLE OF ATTACK VANE BEARINGS

(71) Applicant: Rosemount Aerospace Inc., Burnsville, MN (US)

(72) Inventors: William B. Krueger, Bloomington, MN (US); Richard Alan Schwartz, Fairbault, MN (US); Kenneth Freeman, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 548 days.

(21) Appl. No.: 15/267,309

(22) Filed: Sep. 16, 2016

(65) Prior Publication Data

US 2018/0079525 A1    Mar. 22, 2018

(51) Int. Cl.
| | |
|---|---|
| *B64D 45/02* | (2006.01) |
| *B64D 43/00* | (2006.01) |
| *B64D 43/02* | (2006.01) |
| *F16C 11/04* | (2006.01) |
| *F16C 33/30* | (2006.01) |
| *F16C 19/16* | (2006.01) |

(52) U.S. Cl.
CPC ............ *B64D 45/02* (2013.01); *B64D 43/00* (2013.01); *B64D 43/02* (2013.01); *F16C 11/04* (2013.01); *F16C 33/303* (2013.01); *F16C 19/16* (2013.01); *F16C 2202/32* (2013.01); *F16C 2206/40* (2013.01); *F16C 2326/43* (2013.01)

(58) Field of Classification Search
CPC ........ B64D 43/00; B64D 43/02; B64D 45/00; B64D 45/02; G01P 13/025
USPC ......................................................... 244/1 A
See application file for complete search history.

(56) References Cited

U.S. PATENT DOCUMENTS

| | | | | | |
|---|---|---|---|---|---|
| 3,548,654 | A | * | 12/1970 | Cole, Jr. ................... | G01P 5/07 415/2.1 |
| 3,665,760 | A | * | 5/1972 | Pitches .................. | B64D 43/02 73/170.02 |
| 3,882,721 | A | * | 5/1975 | Neary ..................... | B64D 43/02 73/170.02 |
| 4,230,290 | A | * | 10/1980 | Townsend ............. | G01P 13/025 244/1 R |
| 5,059,041 | A | * | 10/1991 | Watanabe ............... | F16C 19/52 384/476 |

(Continued)

OTHER PUBLICATIONS

Sweers et al.; Lightning Strikes: Protection, Inspection, and Repair; Nov. 30, 2012; Boeing; <https://www.boeing.com/commercial/aeromagazine/articles/2012_q4/4/>. (Year: 2012).*

(Continued)

*Primary Examiner* — Richard R. Green
*Assistant Examiner* — Michael A. Fabula
(74) *Attorney, Agent, or Firm* — Kinney & Lange, P.A.

(57) ABSTRACT

The bearings of aircraft angle of attack (AOA) vanes are susceptible to lightning strike damage, which causes fluting on the inner and outer races of the bearings and causes the bearings to generate friction, noise, and vibrations. To prevent the bearings from experiencing damage due to lightning strikes, the bearings, the shaft, and/or the mounting plate are configured to create an electric isolator to prevent the electric current from the lightning strike from passing through the bearings, thereby preventing the bearings from incurring lightning strike damage.

15 Claims, 6 Drawing Sheets

(56) References Cited

U.S. PATENT DOCUMENTS

| | | | | |
|---|---|---|---|---|
| 5,438,865 A * | 8/1995 | Greene | ............... | G01P 13/025 73/170.05 |
| 5,544,526 A * | 8/1996 | Baltins | ................... | G01P 5/165 73/180 |
| 6,030,128 A * | 2/2000 | Pontzer | .................. | F16C 35/00 384/476 |
| 8,393,791 B2 * | 3/2013 | Thornton | ................ | B64C 9/02 384/192 |
| 9,482,269 B2 * | 11/2016 | Fruin | ..................... | F16C 33/74 |
| 2001/0048781 A1 | 12/2001 | Kawamura et al. | | |
| 2003/0110852 A1 * | 6/2003 | Golly | .................... | B64D 43/02 73/180 |
| 2011/0038576 A1 * | 2/2011 | Thornton | ................ | B64C 9/02 384/476 |
| 2014/0230539 A1 * | 8/2014 | Perju | .................... | G01P 13/025 73/180 |
| 2015/0344137 A1 * | 12/2015 | Bartz | .................... | G01P 13/025 219/201 |
| 2015/0357876 A1 * | 12/2015 | Eriksen | ................ | F16C 41/002 290/55 |
| 2016/0033356 A1 * | 2/2016 | DeAngelo | ............... | G01M 3/40 324/694 |
| 2016/0076584 A1 * | 3/2016 | Fruin | .................... | F16C 33/74 384/134 |
| 2017/0361944 A1 * | 12/2017 | Schmidt | ................. | B32B 3/266 |
| 2018/0178928 A1 * | 6/2018 | Moupfouma | .......... | B64D 45/02 |

OTHER PUBLICATIONS

Extended European Search Report for EP Application No. 17191546. 5, dated Nov. 24, 2017, 5 pages.

* cited by examiner

US 10,457,412 B2

ELECTRICAL ISOLATION OF ANGLE OF ATTACK VANE BEARINGS

BACKGROUND

The present disclosure relates generally to electrically isolating angle of attack vanes. More particularly, this disclosure relates to electrically isolating the bearings of angle of attack vanes.

Angular measurement devices, such as angle of attack (AOA) and side slip angle (SSA) vanes, project from an aircraft body and are free to rotate and align with the prevailing airflow. The angular measurement vane rotates with the prevailing airflow and provides such rotational information to electronics within the aircraft. The trajectory of the aircraft and the degree of rotation of the angular measurement vane is used to calculate the angle of attack or the side slip angle of the aircraft, and such information is provided to the cockpit and to relevant systems on the aircraft.

Angular measurement vanes project outside of the aircraft and into the prevailing airflow. Typically, a shaft extends into the aircraft body from the angular measurement vane and into an electronics enclosure, where electronics measure the rotational displacement of the shaft. Bearings rotatably support the shaft relative to mounting hardware, which mounting hardware is secured to the body of the aircraft. The shaft is thus free to rotate relative to the mounting hardware such that the angular measurement vane is free to rotate with the prevailing airflow. The angular measurement vane, shaft, bearings, and mounting hardware are typically metallic, and the vane and mounting hardware are exposed to the environment, and as such, are particularly susceptible to lightning strikes. The electrical current from a lightning strike on the vane, mounting hardware, or other locations on the aircraft body can pass through the bearings of the angular measurement vane. The large electrical current generated by a lightning strike, which can exceed 130 kilovolts, arcs through the bearings of the angular measurement vane and can cause fluting damage, which can lead to rough or stiff bearing failures.

SUMMARY

According to an aspect of the present disclosure, an angle of attack vane mounting system includes a mounting flange secured to an aircraft, a shaft extending through the mounting flange, a bearing disposed between the mounting flange and the shaft, and an electric isolator. The bearing includes an inner race attached to the shaft and an outer race attached to the mounting flange. The electric isolator is disposed adjacent one of the inner race and the outer race and electrically isolates the bearing such that an electric current is prevented from passing between the inner race and the outer race.

According to another aspect of the present disclosure, an angle of attack vane for an aircraft includes an outboard mounting flange, an inboard mounting flange disposed adjacent the outboard mounting flange, a shaft extending through the outboard mounting flange and the inboard mounting flange, an inboard bearing rotatably supporting the shaft and disposed between the shaft and the inboard mounting flange, an inboard electric isolator configured to prevent an electric current from traveling through the inboard bearing, an outboard bearing rotatably supporting the shaft and disposed between the outboard mounting flange and the shaft, an outboard electric isolator configured to prevent an electric current from traveling through the outboard bearing, and a vane extending from the shaft outboard of the outboard mounting flange.

According to yet another aspect of the present disclosure, a method of preventing lightning strike damage to a bearing of an angle of attack vane includes mounting an angle of attack vane shaft on a bearing disposed between the angle of attack vane shaft and a mounting flange and electrically isolating the bearing such that an electrical current cannot pass between an inner race of the bearing and an outer race of the bearing.

DETAILED DESCRIPTION

Figure 1:
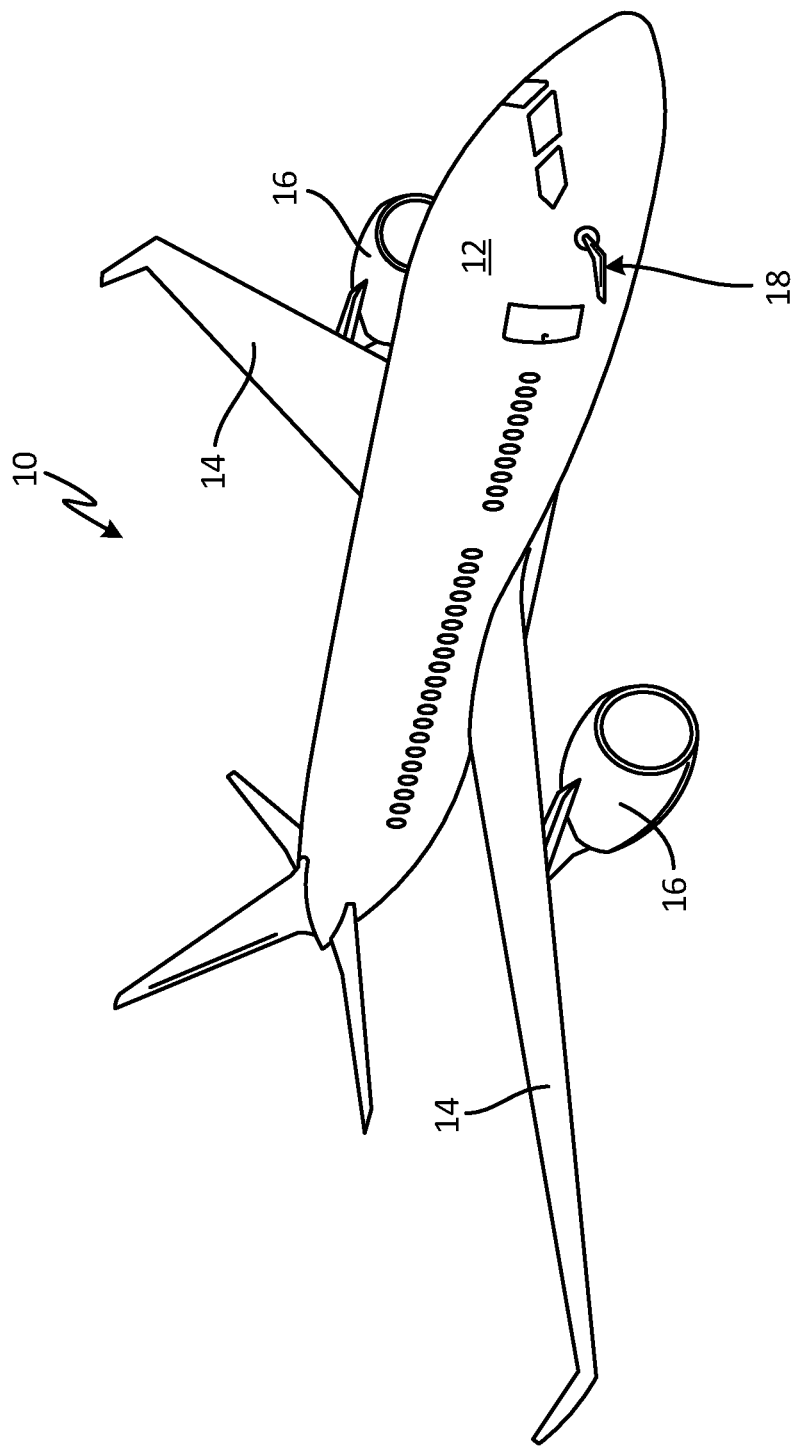
FIG. 1 is a perspective view of an aircraft.

FIG. 1 is a perspective view of aircraft 10. Aircraft 10 includes fuselage 12, wings 14, and engines 16. Fuselage 12 includes angle of attack (AOA) vane 18. AOA vane 18 projects from fuselage 12 forward of wings 14.

During flight, AOA vane 18 rotates to align with the prevailing airflow. AOA vane 18 is preferably located forward of wings 14. Locating AOA vane 18 forward of wings 14 minimizes the effects on AOA vane 18 of the airflow affected by fuselage 12, wings 14, or engines 16, thereby ensuring the accuracy of AOA vane 18. For example, as aircraft 10 ascends, AOA vane 18 aligns with the prevailing airflow and indicates a high angle of attack. As aircraft 10 approaches a cruise altitude AOA vane 18 continues to track with the prevailing airflow, and AOA vane 18 thus indicates a lower angle of attack as aircraft 10 levels off. Because AOA vane 18 projects from fuselage 12, AOA vane 18 is exposed to the elements and is particularly susceptible to lighting strikes. When lightning strikes AOA vane 18 the electrical current generated by the lightning strike travels through AOA vane 18 and seeks a low-impedance path to fuselage 12. While AOA vane 18 is described as measuring the angle of attack, it is understood that AOA vane 18 may be any angular sensing instrument, such as an AOA vane or a side slip angle vane.

Figure 2:
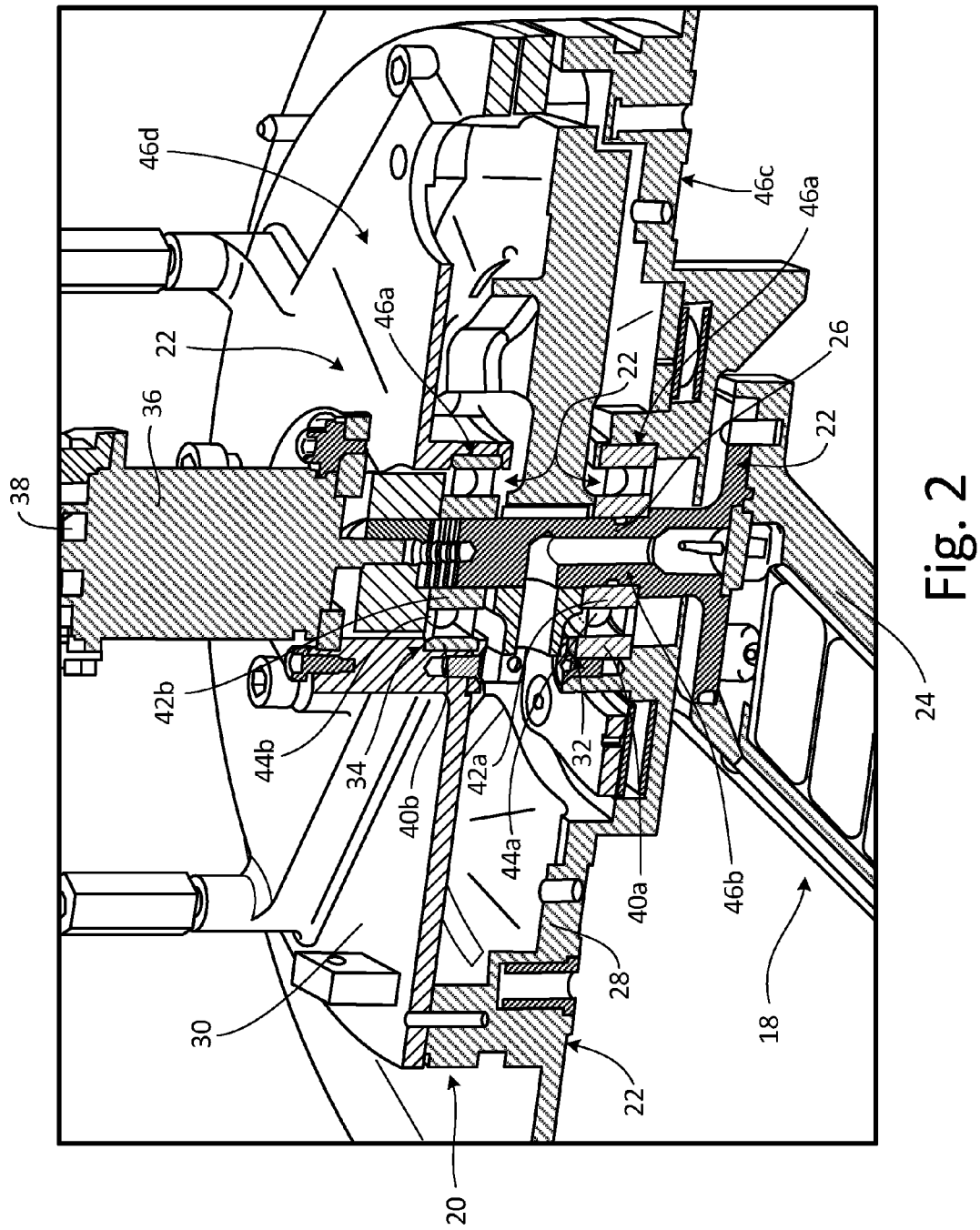
FIG. 2 is a cross-sectional view of an angle of attack vane mounting system having a first electric isolator.

FIG. 2 is a cross-sectional view of AOA vane 18, mounting system 20, and electric isolator 22. AOA vane 18 includes vane body 24 and shaft 26. Mounting system 20 includes outboard mounting flange 28, inboard mounting flange 30, outboard bearing 32, and inboard bearing 34. Mounting system 20 further includes rotary position sensor 36 and damper 38. Outboard bearing 32 includes outer race 40a, inner race 42a, and ball 44a. Inboard bearing 34 outer race 40b, inner race 42b, and ball 44b. Electric isolator 22 may include dielectric barrier 46a, dielectric barrier 46b, dielectric barrier 46c, and dielectric barrier 46d.

Mounting system 20 is attached to fuselage 12 (shown in FIG. 1) and supports AOA vane 18. Outboard mounting flange 28 is disposed outward of and secured to inboard mounting flange 30. Shaft 26 extends through outboard mounting flange 28 and inboard mounting flange 30 and communicates with rotary position sensor 36. Rotary position sensor 36 is inboard of shaft 26 and is configured to sense a rotational displacement of shaft 26. Damper 38 extends about shaft 26 and typically includes a viscous fluid, such as oil, that dampens the rotation of shaft 26, and thus AOA vane 18, to slow the response time of AOA vane 18 to changes in airflow direction. As such, damper 38 ensures a smooth rotation of AOA vane 18, thus providing a smooth reading of the angle of attack. In addition, the damping fluid in damper 38 absorbs oscillations experienced by shaft 26, such as those vibrations experienced due to turbulence, and prevents variations in the angle of attack readings due to unwanted vibrations in shaft 26.

Outboard bearing 32 is disposed between outboard mounting flange 28 and shaft 26 and rotationally supports shaft 26 relative to outboard mounting flange 28. Outer race 40a is attached to outboard mounting flange 28 and inner race 42a is attached to shaft 26. Ball 44a is disposed between outer race 40a and inner race 42a and supports outer race 40a and inner race 42 such that inner race 42a rotates relative to outer race 40a. Inboard bearing 34 is disposed between inboard mounting flange 30 and shaft 26 and rotationally supports shaft 26 relative to inboard mounting flange 30. Outer race 40b is attached to inboard mounting flange 30 and inner race 42b is attached to shaft 26. Ball 44b is disposed between outer race 40b and inner race 42b and supports outer race 40b and inner race 42b such that inner race 42b is free to rotate relative to outer race 40b.

Mounting system 20 is attached to fuselage 12 (shown in FIG. 1). AOA vane 18 is rotatably supported by mounting system 20 with vane body 24 disposed outboard of fuselage 12 and shaft 26 supported by mounting system 20. Outboard mounting flange 28 is typically mounted on an exterior of fuselage 12 and inboard mounting flange 30 is mounted opposite of and attached to outboard mounting flange 28. In this way, outboard mounting flange 28 and inboard mounting flange 30 are attached to fuselage 12 to secure mounting system 20 and AOA vane 18 to fuselage 12.

During flight, the prevailing airflow flows over vane body 24 and vane body 24 rotates to align with the prevailing airflow. Vane body 24 aligning with the prevailing airflow causes shaft 26 to rotate, and rotary position sensor senses the rotational movement of shaft 26. Rotary position sensor 36 senses the rotational displacement of shaft 26 and communicates that information to other systems on aircraft 10 (shown in FIG. 1). The rotational displacement of shaft 26 and other information regarding the trajectory of aircraft 10 is used by the other systems onboard aircraft 10 to calculate the angle of attack, side slip angle, and the true direction of aircraft 10 travel, among other relevant information.

Vane body 24 and outboard mounting flange 28 are disposed outboard of fuselage 12, and as such, vane body 24 and outboard mounting flange 28 are exposed and can attract lightning strikes. When lightning strikes vane body 24 or outboard mounting flange 28, the electrical current seeks the path of least resistance to the metallic aircraft skin, which path of least resistance is typically through outboard bearing 32, inboard bearing 34, or both. The voltage generated by the lighting strike builds on inner race 42a or outer race 40a until the voltage exceeds an insulation level of an oil film layer within outboard bearing 32. When the voltage exceeds the insulation level, the voltage arcs through outboard bearing 32 and creates electrical discharge machining (EDM) pits on inner race 42a and outer race 40a due to rapid melting and cooling of the metallic inner race 42a and outer race 40a. Thousands of EDM pits may be created, and over time ball 44a rolling over the EDM pits can cause fluting damage to outboard bearing 32. In addition, the EDM pits can cause friction within outboard bearing 32. While the effects of a lightning strike on outboard bearing 32 have been described, it is understood that the effects of the lightning strike are equally applicable to inboard bearing 34. As such, a single lightning strike can create EDM pits in both outboard bearing 32 and inboard bearing 34.

Electric isolator 22 prevents the electrical current associated with a lightning strike, which may exceed 130 kilovolts, from arcing across either outboard bearing 32; thereby damaging outer race 40a, inner race 42a, or ball 44a; or inboard bearing 34; thereby damaging outer race 40b, inner race 42b, or ball 44b.

Dielectric barrier 46a may be formed from the components of outboard bearing 32 or inboard bearing 34. As such, dielectric barrier 46a may take the form of a hybrid bearing or a fully non-conducting bearing. For example, ball 44a disposed between outer race 40a and inner race 42a may be comprised of a material forming dielectric barrier 46a. Where ball 44a is formed of the material, preferably a ceramic, forming dielectric barrier 46a, ball 44a forms a non-conducting barrier preventing electrical current from arcing between outer race 40a and inner race 42a. Dielectric barrier 46a may further include a ceramic outer race 40a and a ceramic inner race 42a, and in this way, outboard bearing 32 is a fully non-conducting bearing. By having dielectric barrier 46a be a ceramic ball 44a, a ceramic outer race 40a, a ceramic inner race 42a, or a combination thereof, electric currents are not conducted through outboard bearing 32, and outboard bearing 32 is thus protected from the high voltage of a lightning strike. While dielectric barrier 46a has been described in relation to outboard bearing 32, it is understood that dielectric barrier 46a applies equally to inboard bearing 34 such that one or more of ball 44b, outer race 40b, and inner race 42b may be formed of a non-conducting material, such as ceramic, to form dielectric barrier 46a.

Hybrid bearings, where ball 44a forms dielectric barrier 46a while outer race 40a and inner race 42a remain conducting, and all-dielectric bearings, where ball 44a, outer race 40a, and inner race 42a form dielectric barrier 46a, provide significant advantages. Hybrid bearings provide a higher load rating than all-metal counterparts, thereby increasing the durability and lifespan of the bearings. In addition, hybrid bearings and all-dielectric bearings prevent all electrical currents from passing through the bearing over the expected range of lightning strike voltage. As such, hybrid and all-dielectric bearings both increase the lifespan and utility of outboard bearing 32 and inboard bearing 34, and consequently of AOA vane 18, and prevent outboard bearing 32 and inboard bearing 34 from being damaged by any electrical signal, whether from a lightning strike or from induced electrical currents, such as those created by variable frequency generators, for example.

Similar to dielectric barrier 46a, dielectric barrier 46b prevents the electrical current associated with a lightning strike from arcing across either outboard bearing 32 or inboard bearing 34. Dielectric barrier 46b forms a shaft-side non-conducting barrier. To form dielectric barrier 46b, shaft 26 constructed from a monolithic, dielectric material. For example, shaft 26 may be formed from a ceramic, an engineered plastic, or a non-conductive composite material. Having a monolithic, non-conductive shaft 26 prevents an electrical path from forming through shaft 26 and to either outboard bearing 32 or inboard bearing 34. In this way, dielectric barrier 46b thereby prevents the electric current from flowing through and damaging outboard bearing 32 and inboard bearing 34.

Dielectric barrier 46c similarly prevents an electrical current associated with a lightning strike from arcing between and damaging inner race 42a and outer race 40a. Dielectric barrier 46c forms an outboard mounting flange-side non-conducting barrier about outer race 40a. To form dielectric barrier 46c, outboard mounting flange 28 is formed from a monolithic, dielectric material. As such, outboard mounting flange 28 is preferably comprised of a ceramic, an engineered plastic, or a non-conductive composite material. Dielectric barrier 46c electrically isolates outer race 40a to prevent an electric current from flowing through outer race 40a. As such, outboard bearing 32 is electrically isolated such that no electric current can flow through outboard bearing 32 between inner race 42a and outer race 40a. As such, dielectric barrier 46c prevents outboard bearing 32 from sustaining EDM damage due to lightning strikes.

Similar to dielectric barrier 46c, dielectric barrier 46d electrically isolates outer race 40b and prevents an electrical current associated with a lightning strike from arcing between and damaging inner race 42b and outer race 40b. Dielectric barrier 46d forms an inboard mounting flange-side non-conducting barrier about outer race 40b. To form dielectric barrier 46d, inboard mounting flange 30 preferably comprises a ceramic, an engineered plastic, or a non-conductive composite material. As such, inboard mounting flange 30 forms dielectric barrier 46d, and inboard mounting flange 30 electrically isolates outer race 40b, thereby preventing an electric current from flowing through outer race 40b. Inboard bearing 34 is thus electrically isolated such that an electric current cannot flow through inboard bearing 34 between inner race 42b and outer race 40b. As such, dielectric barrier 46d prevents inboard bearing 34 from sustaining EDM damage caused by lightning strikes.

While electric isolator 22 is described as including dielectric barrier 46a, dielectric barrier 46b, dielectric barrier 46c, and dielectric barrier 46d, it is understood that electric isolator 22 may include as few or as many of dielectric barriers 46a-d as desired. For example, dielectric barrier 46a prevents an electric current from arcing between outer race 40a and inner race 42a by having one or more of ball 44a, outer race 40a, and inner race 42a consist of a ceramic material. As such, dielectric barrier 46a provides sufficient electrical protection to outboard bearing 32 and inboard bearing 34 to prevent outboard bearing 32 and inboard bearing 34 from sustaining lightning strike damage. Dielectric barrier 46a is thus sufficiently robust to protect outboard bearing 32 and inboard bearing 34 and electric isolator may thus include dielectric barrier 46a alone. Similarly, dielectric barrier 46b, dielectric barrier 46c, and dielectric barrier 46d provide sufficient electrical protection to outboard bearing 32 and inboard bearing 34 to prevent outboard bearing 32 and inboard bearing 34 from sustaining lightning strike damage. Therefore, electric isolator 22 may include any one or more of dielectric barrier 46a, dielectric barrier 46b, dielectric barrier 46c, and dielectric barrier 46d.

Electric isolator 22 provides significant advantages. Electric isolator 22 provides increased strength and durability to mounting system 20 and AOA vane 18 by including monolithic, non-conducting dielectric barriers 46b, 46c, and 46d. The monolithic, non-conducting dielectric barriers 46b, 46c, and 46d provide greater structural integrity than metallic alloys, and the monolithic, non-conducting materials also offer greater thermal protection than metallic alloys, thereby reducing the need to heat various components of mounting system 20 and AOA vane 18, such as rotary position sensor 36 and other electronic components. In addition, various combinations of dielectric barriers 46a, 46b, 46c, and 46d provide robust electrical protection. For example, a combination of dielectric barrier 46a and dielectric barrier 46b protects not only outboard bearing 32 and inboard bearing 34 from induced voltages, but also protects rotary position sensor 36, as well as other electronics, because induced voltages cannot pass through shaft 26 due to dielectric barrier 46b.

Figure 3:
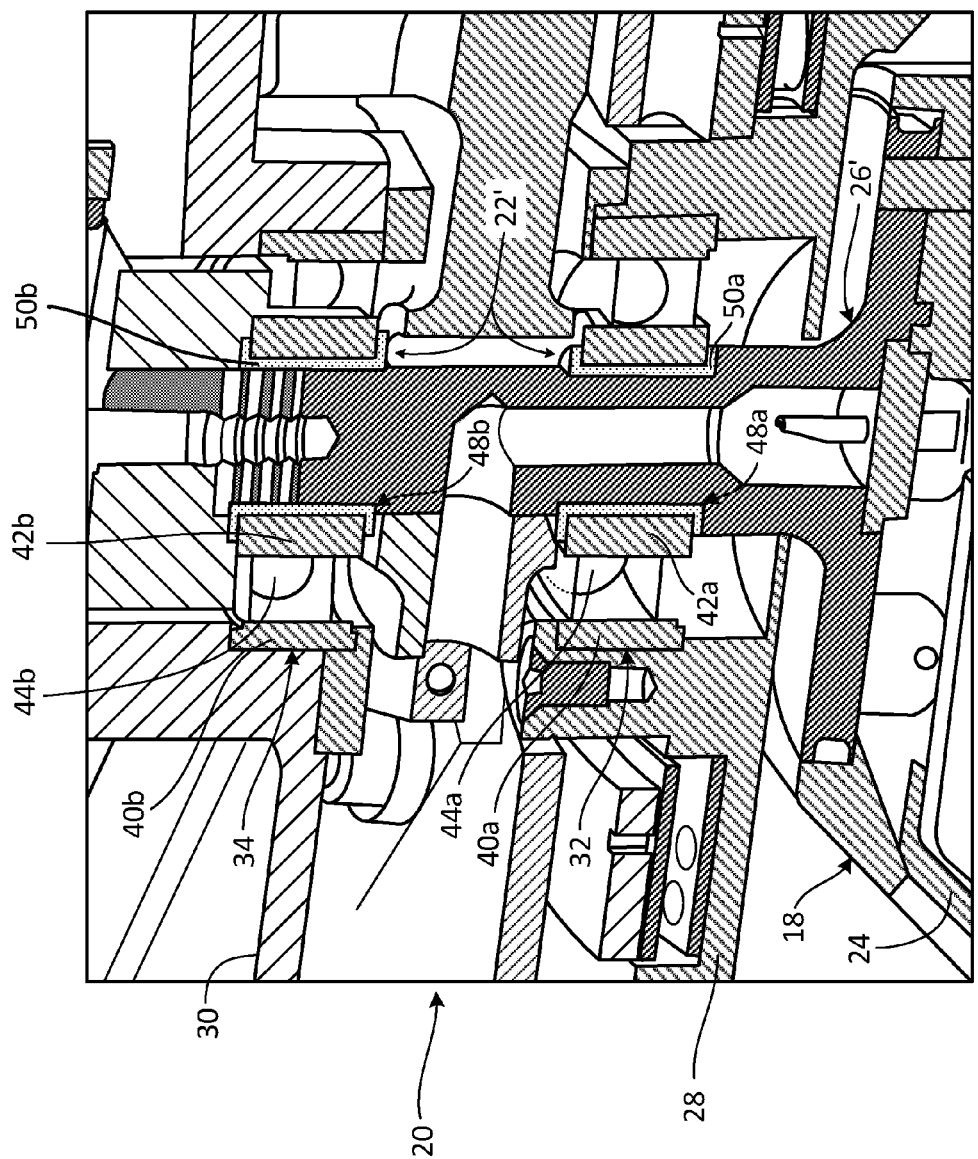
FIG. 3 is a cross-sectional view of an angle of attack vane mounting system having a second electric isolator.

FIG. 3 is a cross-sectional view of AOA vane 18, mounting system 20, and electric isolator 22'. AOA vane 18 includes vane body 24, shaft 26'. Mounting system 20 includes outboard mounting flange 28, inboard mounting flange 30, outboard bearing 32, and inboard bearing 34. Outboard bearing 32 includes outer race 40a, inner race 42a, and ball 44a. Inboard bearing 34 outer race 40b, inner race 42b, and ball 44b. Shaft 26' includes annular notch 48a and annular notch 48b. Electric isolator 22' includes inner dielectric sleeve 50a and inner dielectric sleeve 50b.

Mounting system 20 is attached to fuselage 12 (shown in FIG. 1) and supports AOA vane 18. Outboard mounting flange 28 is disposed on an outward side of fuselage 12 and inboard mounting flange 30 is disposed on an inboard side of fuselage 12. Outboard mounting flange 28 is attached to inboard mounting flange 30 to secure mounting system 20 to fuselage 12. Shaft 26' extends through outboard mounting flange 28 and inboard mounting flange 30. Annular notch 48a extends into shaft 26' adjacent outboard bearing 32, and annular notch 48b extends into shaft 26' adjacent inboard bearing 34.

Outboard bearing 32 is disposed between outboard mounting flange 28 and shaft 26' and rotatably supports shaft 26 relative to outboard mounting flange 28. Outer race 40a is disposed on outboard mounting flange 28 and inner race 42a is disposed on shaft 26' about annular notch 48a. Inner dielectric sleeve 50a is disposed within annular notch 48a between inner race 42a and shaft 26' such that inner race 42a abuts inner dielectric sleeve 50a. Inner dielectric sleeve 50a prevents inner race 42a from contacting shaft 26'. Ball 44a is disposed between outer race 40a and inner race 42a and rotatably supports outer race 40a and inner race 42.

Inboard bearing 34 is disposed between inboard mounting flange 30 and shaft 26' and rotatably supports shaft 26' relative to inboard mounting flange 30. Outer race 40b is disposed on inboard mounting flange 30 and inner race 42b is disposed on shaft 26' about annular notch 48b. Inner dielectric sleeve 50b is disposed within annular notch 48b between inner race 42b and shaft 26' such that inner race 42b contacts inner dielectric sleeve 50b, but inner dielectric sleeve 50b prevents inner race 42b from contacting shaft 26'. Ball 44b is disposed between outer race 40b and inner race 42b and rotatably supports outer race 40b and inner race 42b such that inner race 42b is free to rotate relative to outer race 40b. Inner dielectric sleeve 50a and inner dielectric sleeve 50b are formed from a non-conductive material such that an electric current cannot pass through either inner dielectric sleeve 50a or inner dielectric sleeve 50b.

Vane body 24 and outboard mounting flange 28 are disposed outboard of fuselage 12, and as such, vane body 24 and outboard mounting flange 28 are exposed and can attract lightning. When lightning strikes vane body 24 or outboard mounting flange 28, the electrical current seeks the path of least resistance to the metallic aircraft skin, which path of least resistance is typically through outboard bearing 32, inboard bearing 34, or both. When the electrical current travels through outboard bearing 32, the electrical current arcs between outer race 40a and inner race 42a and can create EDM pits in outer race 40a and inner race 42a. Similarly, the electrical current can arc across inboard bearing 34 between outer race 40b and inner race 42b and create EDM pits in outer race 40b and inner race 42b.

Electric isolator 22' prevents the electrical current associated with a lightning strike, which may exceed 130 kilovolts, from arcing across either outboard bearing 32 or inboard bearing 34. Inner dielectric sleeve 50a provides a first dielectric barrier about shaft 26 between shaft 26' and inner race 42a such that no electric current can travel between inner race 42a and shaft 26'. As such, inner dielectric sleeve 50a prevents the electric current from passing through outboard bearing 32 because the electric current cannot pass through inner dielectric sleeve 50a between inner race 42a and shaft 26'. Inner dielectric sleeve 50a thus electrically isolates outboard bearing 32 such that the electric current generated by a lightning strike cannot travel through outboard bearing 32, thereby preventing outboard bearing 32 from being damaged due to a lightning strike.

Similar to inner dielectric sleeve 50a, inner dielectric sleeve 50b provides a second dielectric barrier about shaft 26, between shaft 26' and inner race 42b such that no electric current can travel between inner race 42b and shaft 26'. As such, inner dielectric sleeve 50b prevents the electric current from passing through outboard bearing 32 because the electric current cannot pass through inner dielectric sleeve 50b between inner race 42b and shaft 26'. Inner dielectric sleeve 50b thus electrically isolates inboard bearing 34 such that the electric current generated by a lightning strike cannot travel through inboard bearing 34, thereby preventing inboard bearing 34 from being damaged due to a lightning strike.

Electric isolator 22' provides significant advantages. Inner dielectric sleeve 50a and inner dielectric sleeve 50b protect outboard bearing 32 and inboard bearing 34 from induced voltages caused by lightning strikes, which can reach upwards of 130 kilovolts. Unlike a ceramic coating on inner race 42a or inner race 42b, which may protect for voltages up to about 3 kilovolts, inner dielectric sleeve 50a and inner dielectric sleeve 50b provide robust electrical protection.

Figure 4:
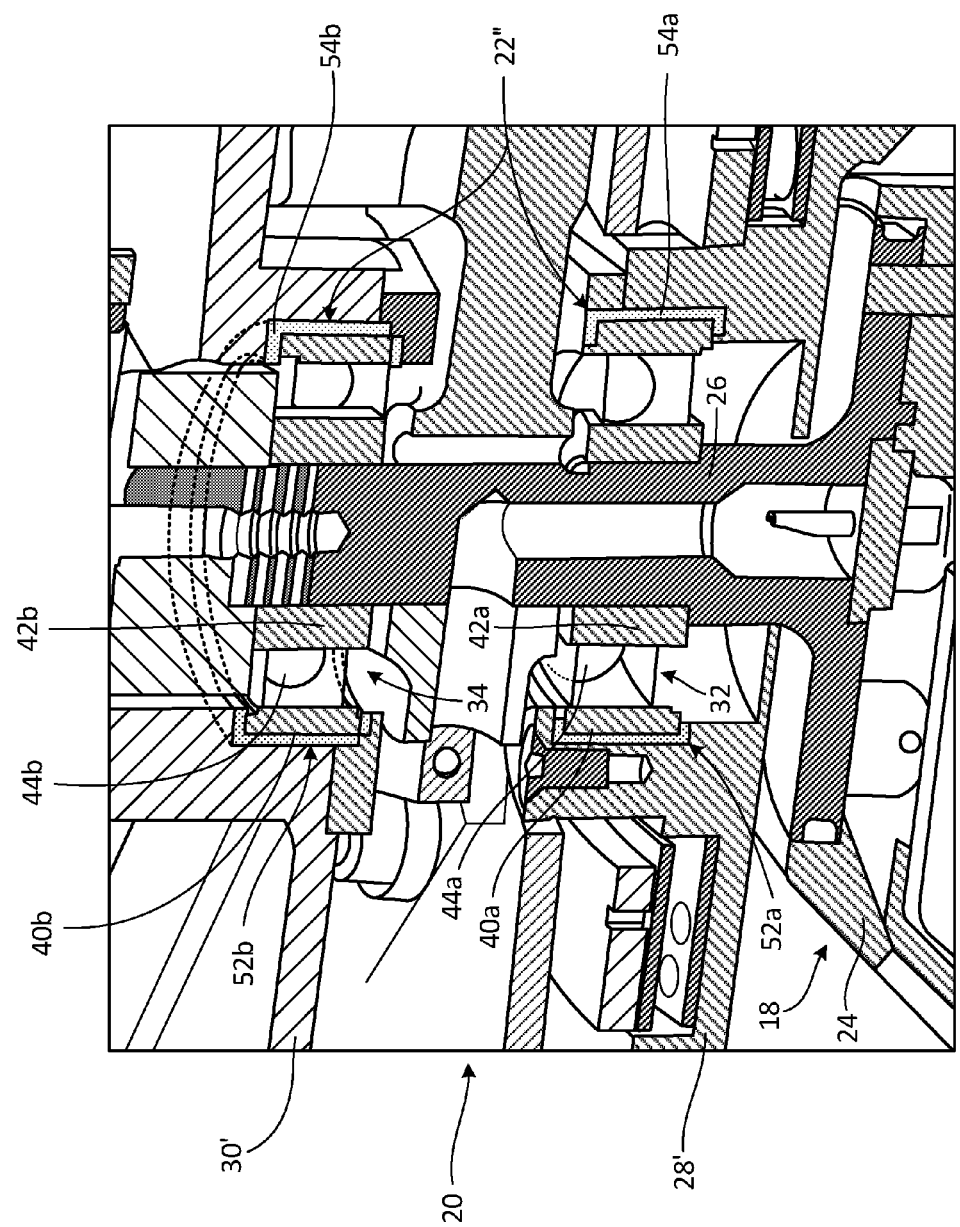
FIG. 4 is a cross-sectional view of an angle of attack vane mounting system having a third electric isolator.

FIG. 4 is a cross-sectional view of AOA vane 18, mounting system 20, and electric isolator 22". AOA vane 18 includes vane body 24, shaft 26. Mounting system 20 includes outboard mounting flange 28', inboard mounting flange 30', outboard bearing 32, and inboard bearing 34. Outboard bearing 32 includes outer race 40a, inner race 42a, and ball 44a. Inboard bearing 34 outer race 40b, inner race 42b, and ball 44b. Outboard mounting flange 28' includes flange notch 52a, and inboard mounting flange 30' includes flange notch 52b. Electric isolator 22" includes outer dielectric sleeve 54a and outer dielectric sleeve 54b.

Mounting system 20 is attached to fuselage 12 (shown in FIG. 1) and supports AOA vane 18. Outboard mounting flange 28' is disposed on an outward side of fuselage 12 and inboard mounting flange 30' is disposed on an inboard side of fuselage 12. Outboard mounting flange 28' is attached to inboard mounting flange 30' to secure mounting system 20 to fuselage 12. Shaft 26 extends through outboard mounting flange 28' and inboard mounting flange 30'. Flange notch 52a extends annularly about an inner wall of outboard mounting flange 28', and outer dielectric sleeve 54a is disposed within flange notch 52a. Flange notch 52b extends annularly about an inner wall of inboard mounting flange 30', and outer dielectric sleeve 54b is disposed within flange notch 52b. Outer dielectric sleeve 54a is made from a non-conducting material, such as a ceramic, an engineered plastic, or a composite material. Similarly, outer dielectric sleeve 54b is made from a non-conducting material, such as a ceramic, an engineered plastic, or a composite material.

Outboard bearing 32 is disposed between outboard mounting flange 28' and shaft 26 and rotationally supports shaft 26 relative to outboard mounting flange 28'. Outer race 40a is disposed on outer dielectric sleeve 54a, which is connected to outboard mounting flange 28' and disposed within flange notch 52a. Inner race 42a is attached to shaft 26, and ball 44a is disposed between outer race 40a and inner race 42a. Inboard bearing 34 is disposed between inboard mounting flange 30' and shaft 26 and rotationally supports shaft 26 relative to inboard mounting flange 30'. Outer race 40b is disposed on outer dielectric sleeve 54b, which is connected to inboard mounting flange 30' and disposed within flange notch 52b. Inner race 42b is attached to shaft 26, and ball 44b is disposed between outer race 40b and inner race 42b.

During flight, air flows over vane body 24 and vane body 24 rotates to align with the prevailing airflow. Vane body 24 projects outboard of fuselage 12, and outboard mounting flange 28' similarly exposed to the environment outboard of fuselage 12. As such, vane body 24 and outboard mounting flange 28' are exposed and can attract lightning strikes. When lightning strikes vane body 24 or outboard mounting flange 28' the electric current attempts to travel to the metallic skin of fuselage 12. When lightning strikes vane body 24, the electrical current travels down vane body 24 and along shaft 26. From shaft 26 the electrical current generally travels through outboard bearing 32 and inboard bearing 34 because outboard bearing 32 and inboard bearing 34 present the path of least resistance to the electrical current. Similarly, when lightning strikes outboard mounting flange 28', the path of least electrical resistance for the electrical current to travel through is through outboard bearing 32, inboard bearing 34, or both. Whether the lightning strikes vane body 24 or outboard mounting flange 28' the electrical current can arc across outboard bearing 32, between outer race 40a and inner race 42a, thereby creating EDM pits in outer race 40a and inner race 42a. The electrical current can also arc across inboard bearing 34, between outer race 40b and inner race 42b, and create EDM pits in outer race 40b and inner race 42b. The EDM pits in both outboard bearing 32 can cause friction and can lead to premature bearing of AOA vane failure.

Electric isolator 22" prevents an electrical current associated with a lightning strike, which may exceed 130 kilovolts, from passing through either outboard bearing 32 or inboard bearing 34. Outer dielectric sleeve 54a provides a dielectric barrier between outer race 40a and outboard mounting flange 28'. Outer dielectric sleeve 54a electrically isolates outboard bearing 32 to prevent any voltage, from stray electrical currents to those generated by a lightning strike, from passing through and damaging outboard bearing 32 between inner race 42a and outer race 40a. In this way, outer dielectric sleeve 54a prevents electrical current from flowing through outboard bearing 32, as the electric current cannot pass through outer dielectric sleeve 54a. Outer dielectric sleeve 54a thus breaks any electrical pathway through outboard bearing 32, thereby protecting outboard bearing 32 from electrical currents.

Similar to outer dielectric sleeve 54a, outer dielectric sleeve 54b provides a dielectric barrier between outer race 40b and inboard mounting flange 30'. Outer dielectric sleeve 54 is disposed between outer race 40b and inboard mounting flange 30' such that outer dielectric sleeve 54 contacts outer race 40 while preventing inboard mounting flange 30' and outer race 40b from coming into contact. Outer dielectric sleeve 54b electrically isolates inboard bearing 34 such that any voltage, from stray electrical currents to those generated by a lightning strike, is prevented from passing through and damaging inboard bearing 34. In this way, outer dielectric sleeve 54b prevents electrical current from flowing through inboard bearing 34 as the electrical current cannot pass through outer dielectric sleeve 54b. Outer dielectric sleeve 54b thus breaks any electrical pathway through inboard bearing 34, thereby protecting inboard bearing 34 from electrical currents.

Electric isolator 22" provides significant advantages. Outer dielectric sleeve 54a and outer dielectric sleeve 54b protect outboard bearing 32 and inboard bearing 34 from induced voltages caused by lightning strikes, which can reach upwards of 130 kilovolts. Unlike a ceramic coating on outer race 40a or outer race 40b, which may protect for voltages up to about 3 kilovolts, outer dielectric sleeve 54a and outer dielectric sleeve 54b provide robust electrical protection.

Figure 5:
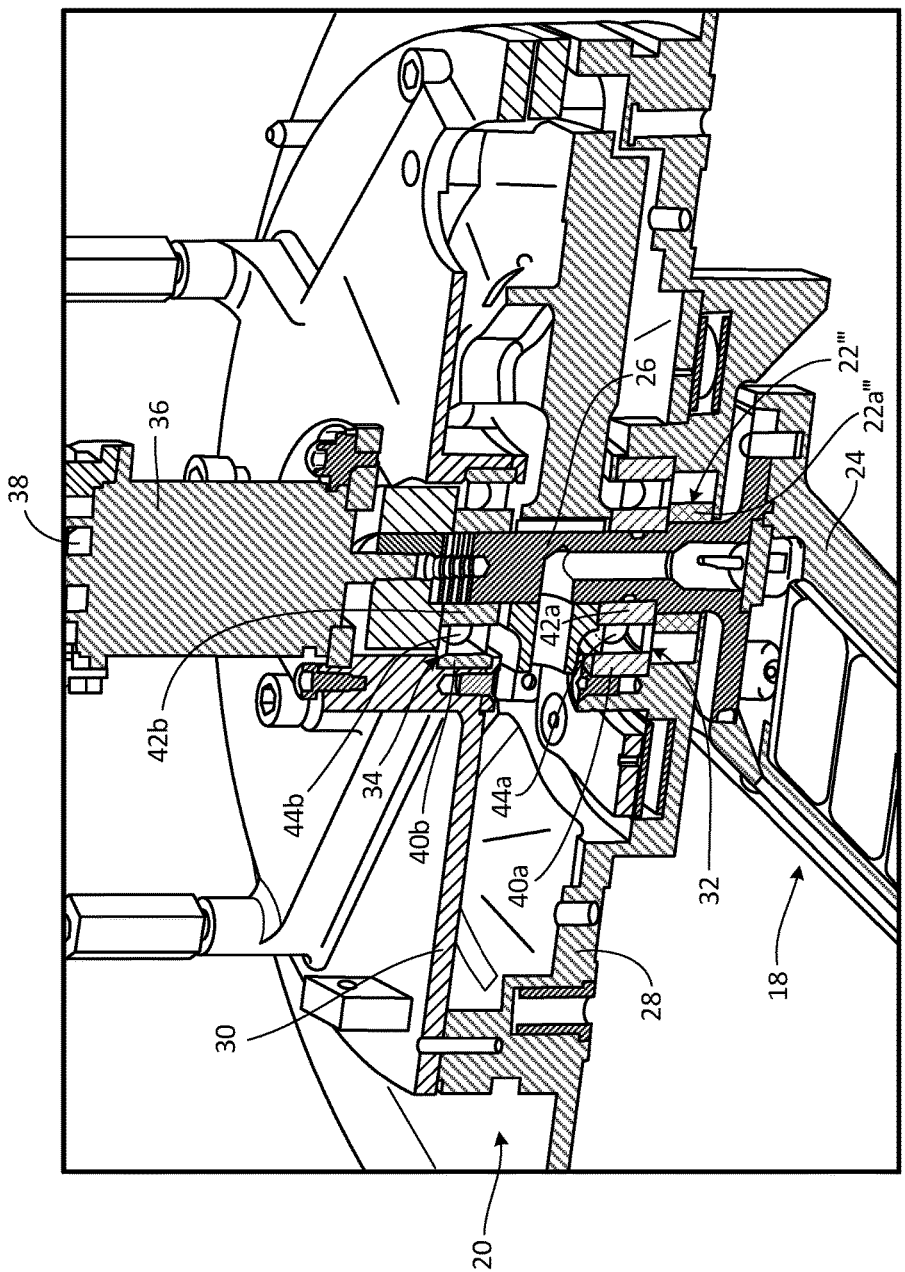
FIG. 5 is a cross-sectional view of an angle of attack vane mounting system and a grounding element.
Figure 5A:
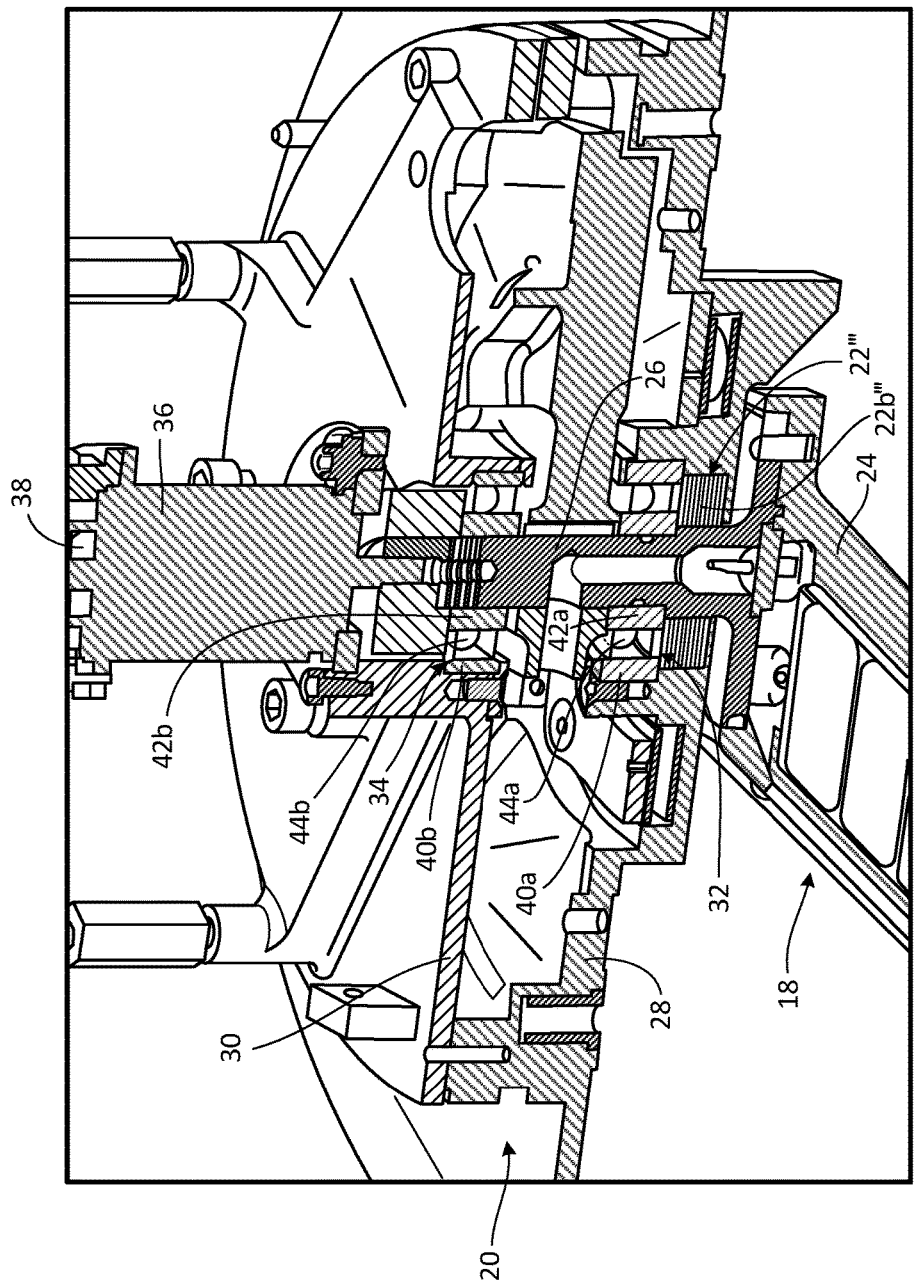
FIG. 5A is a cross-sectional view of an angle of attack vane mounting system and a grounding element.

FIG. 5 is a cross-sectional view of AOA vane 18, mounting system 20, and electric isolator 22'''. FIG. 5A is a cross-sectional view of AOA vane 18, mounting system 20, and electric isolator 22'''. FIGS. 5 and 5A will be discussed together. AOA vane 18 includes vane body 24, shaft 26. Mounting system 20 includes outboard mounting flange 28, inboard mounting flange 30, outboard bearing 32, and inboard bearing 34. Mounting system 20 further includes rotary position sensor 36 and damper 38. Outboard bearing 32 includes outer race 40a, inner race 42a, and ball 44a. Inboard bearing 34 outer race 40b, inner race 42b, and ball 44b.

Mounting system 20 is attached to fuselage 12 (shown in FIG. 1) and supports AOA vane 18. Outboard mounting flange 28 is disposed outward of and secured to inboard mounting flange 30. Shaft 26 extends through outboard mounting flange 28 and inboard mounting flange 30 and communicates with rotary position sensor 36. Rotary position sensor 36 is inboard of shaft 26 and is configured to sense a rotational displacement of shaft 26. Damper 38 extends about shaft 26 and typically includes a viscous fluid, such as oil, that dampens the rotation of shaft 26 and any vibrations experienced by shaft 26. Outboard bearing 32 is attached to both outboard mounting flange 28 and shaft 26 and rotationally supports shaft 26 relative to outboard mounting flange 28. Outer race 40a is attached to outboard mounting flange 28 and inner race 42a is attached to shaft 26. Ball 44a is disposed between outer race 40a and inner race 42a and supports outer race 40a and inner race 42 such that inner race 42a rotates relative to outer race 40a. Inboard bearing 34 is attached to both inboard mounting flange 30 and shaft 26 and rotationally supports shaft 26 relative to inboard mounting flange 30. Outer race 40b is attached to inboard mounting flange 30 and inner race 42b is attached to shaft 26. Ball 44b is disposed between outer race 40b and inner race 42b and supports outer race 40b and inner race 42b such that inner race 42b is free to rotate relative to outer race 40b. Electric isolator 22''' is connected to shaft 26 and is electrically connected to outboard mounting flange 28.

Electric isolator 22''' is a grounding device, such as a grounding ring 22a''' (FIG. 5) or a grounding brush 22b''' (FIG. 5A), connected to shaft 26. Electric isolator 22''' provides an alternate low-impedance path from shaft 26 to outboard mounting flange 28, and thus to the skin of fuselage 12 (shown in FIG. 1). Electric isolator 22''' thus reduces or eliminates voltage on shaft 26, and thus on outboard bearing 32 and inboard bearing 34, by preventing voltage from building on shaft 26. As such, the electrical current generated by a lightning strike is routed away from outboard bearing 32 and inboard bearing 34, thereby protecting both outboard bearing 32 and inboard bearing 34.

Discussion of Possible Embodiments

The following are non-exclusive descriptions of possible embodiments of the present invention.

An angle of attack vane mounting system includes a mounting flange secured to an aircraft; a shaft extending through the mounting flange; a bearing disposed between the mounting flange and the shaft, wherein the bearing includes an inner race attached to the shaft and an outer race attached to the mounting flange; and an electric isolator disposed adjacent one of the inner race and the outer race and electrically isolating the bearing such that an electric current is prevented from passing between the inner race and the outer race.

The angle of attack vane mounting system of the preceding paragraph can optionally include, additionally and/or alternatively, any one or more of the following features, configurations and/or additional components:

The electric isolator comprises a sleeve disposed between the shaft and the inner race.

The electric isolator comprises a sleeve disposed between the mounting flange and the outer race.

The electric isolator comprises a ceramic rolling element disposed between the inner race and the outer race.

The shaft comprises a dielectric material.

An angle of attack vane for an aircraft an outboard mounting flange; an inboard mounting flange disposed adjacent the outboard mounting flange; a shaft extending through the outboard mounting flange and the inboard mounting flange; an inboard bearing rotatably supporting the shaft and disposed between the shaft and the inboard mounting flange; an inboard electric isolator configured to prevent an electric current from traveling through the inboard bearing; an outboard bearing rotatably supporting the shaft and disposed between the outboard mounting flange and the shaft; an outboard electric isolator configured to prevent an electric current from traveling through the outboard bearing; and a vane extending from the shaft outboard of the outboard mounting flange.

The angle of attack vane of the preceding paragraph can optionally include, additionally and/or alternatively, any one or more of the following features, configurations and/or additional components:

The inboard electric isolator includes a ceramic inboard rolling ball disposed between an inboard outer race of the inboard bearing and an inboard outer race of the bearing, wherein the ceramic inboard rolling ball is configured to prevent an electric current from passing between the inboard inner race and the inboard outer race.

The inboard inner race is a dielectric material and the inboard outer race is the dielectric material.

The dielectric material comprises one of a ceramic, an engineered plastic, or a composite material.

A grounding brush is disposed about the shaft and configured to ground the shaft to a fuselage of the aircraft.

The inboard electric isolator includes a first sleeve disposed about the shaft and adjacent an inboard inner race of the inboard bearing, and the outboard electric isolator comprises a second sleeve disposed about the shaft and adjacent an outboard inner race of the outboard bearing.

The inboard electric isolator comprises a first sleeve disposed between the inboard mounting flange and an inboard inner race of the inboard bearing, and the outboard electric isolator comprises a second sleeve disposed between the outboard mounting flange and an outboard inner race of the outboard bearing.

The outboard mounting flange comprises a dielectric material.

The shaft comprises a dielectric material.

The inboard mounting flange comprises a dielectric material.

A method of preventing lightning strike damage to a bearing of an angle of attack vane includes mounting an angle of attack vane shaft on a bearing disposed between the angle of attack vane shaft and a mounting flange, and electrically isolating the bearing such that an electrical current cannot pass between an inner race of the bearing and an outer race of the bearing.

The method of the preceding paragraph can optionally include, additionally and/or alternatively, any one or more of the following features, configurations and/or additional components:

Mounting a ceramic rolling element between the inner race and the outer race.

Mounting a grounding element on the shaft adjacent the bearing, such that the shaft is grounded to an aircraft.

Mounting a dielectric sleeve on the shaft between the shaft and the inner race.

Mounting a dielectric sleeve on a mounting flange adjacent the outer race of the bearing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An angle of attack vane mounting system comprising:
   a mounting flange secured to an aircraft;
   a shaft extending through the mounting flange;
   a bearing disposed between the mounting flange and the shaft, wherein the bearing comprises:
      an inner race attached to the shaft; and
      an outer race attached to the mounting flange; and
   an electric isolator disposed adjacent one of the inner race and the outer race and electrically isolating the bearing such that an electric current is prevented from passing between the inner race and the outer race;
   wherein the electric isolator comprises at least one of a first sleeve disposed between the shaft and the inner race and a second sleeve disposed between the mounting flange and the outer race.

2. The angle of attack vane mounting system of claim 1, wherein the electric isolator further includes a ceramic rolling element disposed between the inner race and the outer race.

3. The angle of attack vane mounting system of claim 1, wherein the shaft comprises a dielectric material.

4. An angle of attack vane for an aircraft, the angle of attack vane comprising:
   an outboard mounting flange;
   an inboard mounting flange disposed adjacent the outboard mounting flange;
   a shaft extending through the outboard mounting flange and the inboard mounting flange;
   an inboard bearing rotatably supporting the shaft and disposed between the shaft and the inboard mounting flange;
   an inboard electric isolator configured to prevent an electric current from traveling through the inboard bearing;
   an outboard bearing rotatably supporting the shaft and disposed between the outboard mounting flange and the shaft;
   an outboard electric isolator configured to prevent an electric current from traveling through the outboard bearing; and
   a vane extending from the shaft outboard of the outboard mounting flange;
   wherein the inboard electric isolator comprises at least one of a first sleeve disposed about the shaft and adjacent an inner race of the inboard bearing and a second sleeve disposed between the inboard mounting flange and an outer race of the inboard bearing; and
   wherein the outboard electric isolator comprises at least one of a third sleeve disposed about the shaft and adjacent an inner race of the outboard bearing and a fourth sleeve disposed between the outboard mounting flange and an outer race of the outboard bearing.

5. The angle of attack vane of claim 4, wherein the inboard electric isolator comprises:
   a ceramic inboard rolling ball disposed between an inboard inner race of the inboard bearing and an inboard outer race of the inboard bearing, wherein the ceramic inboard rolling ball is configured to prevent an electric current from passing between the inboard inner race and the inboard outer race.

6. The angle of attack vane of claim 5, wherein the inboard inner race is formed from a first dielectric material and the inboard outer race is formed from a second dielectric material.

7. The angle of attack vane of claim 6, wherein each of the first dielectric material and the second dielectric material comprise one of a ceramic, an engineered plastic, or a composite material.

8. The angle of attack vane of claim 4, wherein the outboard mounting flange comprises a dielectric material.

9. The angle of attack vane of claim 4, wherein the shaft comprises a dielectric material.

10. The angle of attack vane of claim 4, wherein the inboard mounting flange comprises a dielectric material.

11. An angle of attack vane for an aircraft, the angle of attack vane comprising:
    an outboard mounting flange;
    an inboard mounting flange disposed adjacent the outboard mounting flange;
    a shaft extending through the outboard mounting flange and the inboard mounting flange;
    an inboard bearing rotatably supporting the shaft and disposed between the shaft and the inboard mounting flange;
    an inboard electric isolator configured to prevent an electric current from traveling through the inboard bearing;
    an outboard bearing rotatably supporting the shaft and disposed between the outboard mounting flange and the shaft;

an outboard electric isolator configured to prevent an electric current from traveling through the outboard bearing; and a vane extending from the shaft outboard of the outboard mounting flange;

wherein a grounding element is disposed about the shaft and configured to ground the shaft to a fuselage of the aircraft.

12. The angle of attack vane of claim 11, wherein the grounding element comprises one of a grounding brush and a grounding ring.

13. A method of preventing lightning strike damage to a bearing of an angle of attack vane, the method comprising:

mounting an angle of attack vane shaft on a bearing disposed between the angle of attack vane shaft and a mounting flange; and electrically isolating the bearing such that an electrical current cannot pass between an inner race of the bearing and an outer race of the bearing;

wherein electrically isolating the bearing includes at least one of:

mounting a dielectric sleeve on the shaft between the shaft and the inner race; and mounting a dielectric sleeve on a mounting flange adjacent the outer race of the bearing.

14. The method of claim 13, wherein the step of electrically isolating the bearing such that an electrical current cannot pass between an inner race of the bearing and an outer race of the bearing comprises:

mounting a ceramic rolling element between the inner race and the outer race.

15. A method of preventing lightning strike damage to a bearing of an angle of attack vane, the method comprising:

mounting an angle of attack vane shaft on a bearing disposed between the angle of attack vane shaft and a mounting flange; and electrically isolating the bearing such that an electrical current cannot pass between an inner race of the bearing and an outer race of the bearing;

wherein electrically isolating the bearing includes mounting a grounding element on the shaft adjacent the bearing, such that the shaft is grounded to an aircraft.

* * * * *